United States Patent Office 3,525,666
Patented Aug. 25, 1970

3,525,666
PROCESS FOR PREPARING KRAFT PULPING LIQUOR FROM BLACK LIQUOR INCLUDING SEPARATE CARBONATION WITH COMBUSTION GASES AND EVAPORATION STEPS
Rolf Brannland, Alfredshem, Sweden, assignor to Mo och Domsjo Aktiebolag, Ornskoldsvik, Sweden, a limited company of Sweden
No Drawing. Continuation-in-part of application Ser. No. 482,908, Aug. 26, 1965. This application Mar. 11, 1969, Ser. No. 806,297
Claims priority, application Sweden, Aug. 31, 1965, 10,435/65
Int. Cl. D21c *11/12*
U.S. Cl. 162—30                                               10 Claims

ABSTRACT OF THE DISCLOSURE

A process is provided for recovering economically sulfur lost as hydrogen sulfide from black liquor during evaporation in black liquor reclaiming processes, and reusing the sulfur content of the hydrogen sulfide in preparing white liquor for pulping in the kraft process. The hydrogen sulfide is obtained from the black liquor by carbonating the black liquor to a pH below 11 with combustion gases containing at least 15% $CO_2$, and thereafter stripping hydrogen sulfide from the resulting liquor by evaporating the liquor without addition of combustion gases, oxidizing the hydrogen sulfide to sulfur, and dissolving the sulfur in a sulfide-containing aqueous solution to form fresh white liquor.

---

This application is a continuation-in-part of Ser. No. 482,908, filed Aug. 26, 1965, now abandoned.

The preparation of chemical and semichemical cellulose pulps from wood requires considerable quantities of cooking chemicals. Rydholm, Pulping Processes, Interscience Publishers, New York (1965), Chapter 11, page 764, indicates that from 200 to 500 kg. per ton of pulp are used. Therefore, as Rydholm indicates, it is of vital economic interest to recover as much of the spent chemicals as possible from spent black liquor, and use them in the preparation of fresh white cooking liquor. Accordingly, a number of recovery processes have been developed, and are in use in the U.S.A., Sweden, and elsewhere.

The black liquor or waste liquor from the kraft pulp cooking operations contains the cooking chemicals in a dilute solution, which in most instances has to be concentrated before the chemicals can be recovered and regenerated. In order to dispose of the organic substances which are contained in the waste liquor, most recovery processes require that they be burnt, using the heat liberated in the combustion, for example, in evaporation of black liquor. The inorganic chemicals can then be recovered from the combustion residue or smelt, and used in the preparation of a fresh batch of cooking or white liquor.

At pages 766 and 767, Rydholm summarizes the steps in ten chemicals recovery processes for use in various pulp cooking processes. These procedures generally include the steps of evaporation of the liquor, combustion of the organic materials, recovery of chemicals from the residue, and the conversion of these into a form which can be used in the preparation of fresh cooking liquor.

In a pulping mill based on the kraft process, the principal inorganic chemicals recovered as the result of the recovery process are sodium carbonate and sodium sulfide. Since the cooking liquor consists mainly of hydroxide and sulfide, causticizing is necessary to convert the carbonate to hydroxide. The kraft cooking pulping liquor also contains lignins and organic acids in the form of their sodium salts, as well as sodium hydrosulfide. The organic materials are destroyed by combustion. A typical kraft black liquor, according to Rydholm, page 774, has the following composition:

BLACK LIQUOR (TOTAL SOLIDS 17–22 PERCENT)

| | Percent of total solids |
|---|---|
| Alkali lignin | 41 |
| Extractives | 3 |
| Hydroxy acids and lactones | 28 |
| Acetic acid | 5 |
| Formic acid | 3 |
| Methanol | 1 |
| Sulfur | 3 |
| Sodium | 16 |
| Total | 100 |

This liquor is evaporated, and sodium sulfate is added prior to combustion as make-up to replace losses of sodium and sulfur. There are losses of sulfur during the evaporation, as hydrogen sulfide, and there are also losses of sulfur during the combustion, as sodium sulfate and $SO_2$, and the residue from the combustion, as indicated, is composed of sodium carbonate and sodium sulfide. Thus, in the usual recovery process the only sulfur recovered from the waste kraft liquor is in the form of sodium sulfide, as a residue after the combustion.

Although it is recognized that during the evaporation a considerable amount of sulfur is lost as hydrogen sulfide, it has been impractical to recover this hydrogen sulfide in the usual recovery process. The total solids content of a normal black liquor is about 20 percent, but it can be considerably less, as low as 15 percent, depending on the moisture content of the wood, and the degree of dilution in the washing operation, and to a lesser extent, the amount of liquor charged to the cook, and the pulp yield. In order to obtain proper ignition and burning of the organic materials in the combustion step, it is necessary to concentrate the liquor to a solids content of from 50 to 70 percent. Thus, considerable amounts of water must be removed, and the amount is generally of the order of from 6 to 8 cubic meters per ton of pulp. The liquor is quite alkaline, having a pH of 12 or more, and thus the concentration of hydrogen sulfide in the escaping gases is rather low, so low, that it is impractical to separate it from the condensible gases.

There are various techniques for evaporation of waste pulping liquors. Rydholm indicates that the two principal categories of evaporators are the film type (such as a cascade evaporator) and the forced-circulation type (such as a cyclone evaporator or a venturi scrubber). Kibrick, Scopp and Colton, U.S. Pat. No. 2,944,928, dated July 12, 1960, describe the use in addition of direct heat evaporators.

In this procedure (Britt, Handbook of Pulp and Paper Technology, Reinhold Publishing Corp. New York, 1964, page 189), the black liquor is passed through multiple effect evaporators to an average of 45 to 55 percent solids (concentrated from the original 15 to 20 percent solids), and is then further concentrated to between 62 and 70 percent solids in a direct-contact evaporator. The liquor and flue gases from the feed water heater or air heater are brought into intimate physical contact. When this is done, however, rather large volumes of flue gases are needed, and the flue gases further dilute the gases liberated from the evaporating liquor. Thus, the concentration of hydrogen sulfide in the resulting gases becomes even less than normal. Since the flue gases are noncondensible, this greatly increases the difficulty of recovery of hydrogen sulfide. Moreover, the flue gases include a high proportion of oxygen, and the sulfide of the black liquor is readily oxidized to thiosulfate, corresponding to a molar ratio $O_2:H_2S$ of 1:1. Such reactions further reduce the concentration of hydrogen sulfide. Thus, in the Kibrick process the recovery of hydrogen sulfide is even less practical than in the normal evaporation procedure.

Kibrick et al. indicate that the hydrogen sulfide is partially removed in the evaporators (presumably, during concentration from 15 to 20 percent solids to 45 to 55 percent solids) as a result of the following reaction:

$$NaHS+H_2O \rightleftharpoons NaOH+H_2S$$

They state, further, that in the direct heat evaporators (where concentration is increased to 62 to 70 percent) hydrogen sulfide is readily evolved, but not completely in most reactions, as a result of the carbonation reaction which occurs as a result of the direct contact with the flue gases. However, Kibrick et al. do not explain the nature of the carbonation reaction to which they refer, so it is not clear what they had in mind, nor do they give the carbon dioxide content of the flue gases they contemplate, or the pH of the liquor being evaporated, nor do they suggest how to recover hydrogen sulfide liberated in this way from either the effluent from the mulitple effect evaporators or the direct contact evaporators.

The reasons why it is difficult to recover hydrogen sulfide from the gases emitted from the evaporating liquor are readily seen by a study of typical plant conditions. In a kraft pulp mill producing 20 tons per hour of pulp, yielding a black liquor containing 15 percent solids, an evaporation of the black liquor to 60 percent solids content requires the evaporation of 80 cubic meters of water per ton of pulp. This means that 60 kg. of water must be evaporated per cubic meter of liquor. This requires a quantity of heat equivalent to 32,000 kilo calories per cubic meter of liquor. The heat recovered from hot flue gases is about 60 kilogram-calories per normal cubic meter, and thus to supply solely from direct contact with flue gases, as in the Kibrick et al. process, the amount of heat required to evaporate this much water, 550 normal cubic meters of flue gas are required, per cubic meter of unevaporated liquor. This is a very large volume of gas, which of course dilutes the noncondensible gases liberated from the black liquor. Even if the flue gases are restricted to the direct contact evaporators, the volume is over 180 normal cubic meters.

If the available quantity of hydrogen sulfide liberated from the black liquor in the course of the evaporation is 280 cubic meters per hour, it is seen that with 90,000 normal cubic meters per hour of the gases, the hydrogen sulfide concentration in the gases from the black liquor will be only 0.3 percent. It is no greater in the effluent from the direct contact evaporators. Such a small volume cannot be economically recovered. Moreover, if the oxygen concentration in the flue gases is 0.3 percent, there is a considerable probability that the main part of the hydrogen sulfide to be stripped off by the flue gases will be oxidized to thiosulfate, since one mole of oxygen is capable of converting one mole of sulfide to thiosulfate.

Despite the low concentrations of hydrogen sulfide that are liberated in the normal evaporation process, it is apparent that the increasing cost of the chemicals consumed in pulping requires economic recovery of as many chemicals as possible, and this includes the sulfur content of the liquor that is lost during the evaporation stage. Moreover, heat economy requires that this be done with the least possible expenditure of heat, consistent with concentration of the liquor to the desired solvents content. It is thus most undesirable to dilute the gases from the evaporating liquor to the extent required in the process described in Kibrick et al. No. 2,944,928.

Recovery of hydrogen sulfide from the waste gases is also important for another reason. There is an increasing interest by local authorities in preventing atmospheric pollution, and their concern is particularly directed to preventing the liberation of noxious, foul-smelling gases into the atmosphere. This problem is particularly acute in regions near pulping mills. Consequently, and process improvement which can result in a minimization or elimination of the liberation of such gases during the evaporation of waste pulping liquor becomes quite important.

In accordance with the instant invention, a process is provided for the economical recovery of hydrogen sulfide from the waste gases obtained during the evaporation of black liquor, and particularly polysulfide-containing black liquor, obtained at the conclusion of the kraft pulping process. The process includes a preliminary preparation of the liquor for evaporation in a manner which ensures the liberation of a relatively high concentration of hydrogen sulfide in the gases (compared to that normally liberated) and a high ratio of hydrogen sulfide to oxygen in such gases, while at the same time holding to a minimum the volume of flue or combustion gases or other noncondensible gases brought in contact with the evaporating liquor.

In the process of the invention, the black liquor from a kraft pulping process is first carbonated with combustion gases containing at least about 15 percent carbon dioxide, in an amount to reduce the alkaline black liquor to a pH below 11, the combustion gases being less than about 11 normal cubic meters per cubic meter of available hydrogen sulfide, and then hydrogen sulfide is stripped from the resulting liquor, while evaporating the liquor to increase the solids content to at least 45 percent, thereby removing a portion of the sulfur of the liquor as hydrogen sulfide, and forming a proportion of at least 80 percent hydrogen sulfide in the noncondensible gases liberated from the black liquor, recovering hydrogen sulfide from the gases evolved in the evaporation, oxidizing the recovered hydrogen sulfide to sulfur with air or sulfur dioxide, and dissolving the sulfur in a sulfide-containing aqueous solution to form a sulfide cooking liquor, and preferably a polysulfide cooking liquor. The sulfide-containing aqueous solution is preferably obtained by combustion of the evaporated liquor, to form a residue comprising a alkali carbonate and alkali sulfide, causticizing the residue to form alkali hydroxide and alkali sulfide, and dissolving the residue in water.

An important feature of the applicants' invention is the preliminary carbonation of the black liquor with combustion gases that contain a high proportion of carbon dioxide, prior to the evaporation step. It is essential in order to obtain a high concentration of hydrogen sulfide in the gases liberated from the black liquor that the diluting noncondensible gases be kept to a minimum volume. This can only be done if the carbon dioxide content is high, and the carbonation step is separate from the evaporation. The use of a high proportion of carbon dioxide ensures that an effective carbonation is obtained, accompanied by a sufficient reduction in pH to ensure that the following reactions occur:

(1) $Na_2S+CO_2+H_2O \rightarrow NaHCO_3+NaHS$ (2) $NaHS+CO_2+H_2O \rightarrow NaHCO_3+H_2S$ (dissolved)

Then, during stripping (evaporation), these reactions occur:

(3) $NaHS+NaHCO_3 \rightarrow Na_2CO_3+H_2S\uparrow$ (4) $H_2S$ (dissolved) $\rightarrow H_2S\uparrow$ If reactions (1) and (2) are not carried out first, as a preliminary step, the reaction that occurs is possibly that set out by Kibrick et al., above, or, more probably:

$$2NaHS + Na_2S \rightarrow H_2S\uparrow$$

There is no upper limit on the proportion of carbon dioxide in the combustion gases, but the normal combustion process, the carbon dioxide content of the combustion gases does not exceed about 21 percent, and is frequently only within the range from 15 to 18 percent.

If the carbon dioxide concentration is high, then it is possible in the carbonation step to use an amount of combustion gases that is less than 20 normal cubic meters per cubic meter of unevaporated black liquor. No combustion gases are added during evaporation. This is to be contrasted with the 550 normal cubic meters of flue gas per cubic meter of unevaporated liquor required in the Kibrick process, as indicated above.

The pH of the black liquor is reduced to not over 11 during the carbonation step. When alkalinity is reduced to below 11 by carbonation, the organic components present in the black liquor are not precipitated, provided the pH is not brought below about 9 and accordingly there are no complications in this decrease in pH. Preferably, the pH is brought to from about 11 to about 9, by carbonation.

The carbonation makes it possible to increase the proportion of hydrogen sulfide in the noncondensible gases liberated from the black liquor during evaporation. The correlation between sulfur liberated as hydrogen sulfide and pH is shown in the following table, which represents the amount of hydrogen sulfide recovered during the stripping operation, based on the total amount of sulfur in the liquor:

| pH: | Percent S lost as $H_2S$ |
|---|---|
| 11.1 | 9 |
| 10.5 | 15 |
| 10.0 | 18 |
| 9.5 | 21 |
| 9.0 | 23 |

Thus, if more than 18 percent of the sulfur is to be liberated as hydrogen sulfide, a pH of from 10 to 9 is used, and if less than 18 percent of the sulfur is to be liberated, as hydrogen sulfide, a pH of from 9 to 11 is used.

The proportion can be adjusted as desired, since the sulfur remaining in the liquor is recovered later, as sodium sulfide or sodium hydrosulfide (except for losses as $SO_2$ and sodium sulfate during combustion). Thus, the proportion can be set to give whatever ratio of sulfur to sodium sulfide or hydrosulfide in the regenerated pulping liquor may be desired. If a polysulfide pulping liquor is desired, a higher ratio of hydrogen sulfide may be preferred.

It is desirable to liberate a larger-than-normal proportion of hydrogen sulfide during the evaporation, so as to maintain an at least 90 percent concentration of hydrogen sulfide in the noncondensible gases liberated from the liquor, since this high concentration facilitates the conversion of the hydrogen sulfide to sulfur via the Claus process, without further purification. It may be more economical, from the standpoint of sulfur recovery, to liberate a larger proportion of hydrogen sulfide in the evaporation stage, and recover this as sulfur, leaving less to be recovered later as sodium sulfide or sodium hydrosulfide, and reducing combustion losses as $SO_2$ and sulfate, than to attempt to retain all the sulfur in the liquor as sodium sulfide or sodium hydrosulfide, as was intended in prior procedures. In any case, it is well recognized that it is not possible to remove all of the sulfur from the liquor as hydrogen sulfide (and this, of course, is evidenced in the above), unless the pH is brought to the acid side, i.e., below 7, which is not desirable, because of precipitation problems. Accordingly, in accordance with the invention, the pH of the waste liquor is brought to within the range from about 8 to about 11, by carbonation.

In the process of the invention, the carbonation is carried out as a separate step prior to evaporation. In this way, the combustion gases employed from the carbonation are not mixed with the gases liberated from the liquor during evaporation. This makes it possible further to increase the concentration of hydrogen sulfide in such gases.

By "combustion gases" is meant the gases that are obtained during the combustion stage in the kraft black liquor recovery process. This stage follows evaporation of the liquor. The organic constituents which are present after evaporation are simply burned, using conventional procedures, as described in Rydholm, Chapter 11, pages 776 to 791, the disclosure of which is hereby incorporated by reference. The combustion is controlled in such a manner that the concentration of carbon dioxide in such combustion gases is at least 15 percent.

Following the carbonation step, the black liquor is then evaporated, from the original dilute condition to a solids concentration of at least 45 percent, and preferably from 50 to 65 percent. This evaporation can be carried out in one or in several stages, at atmospheric or reduced pressure, but for economic reasons it is usually carried out under vacuum, in several stages. The hydrogen sulfide is a component of the noncondensible gases (the condensible gases being primarily steam), and the noncondensible gases from each stage are collected, say, in a common conduit, which is connected usually over a heat exchanger to a vacuum pump, ejector, or alkali wash. The heat content of the noncondensible gases can be used in the heat exchanger to heat up waste liquor to be evaporated, thus conserving heat. The noncondensible gases can be passed to a vacuum pump, ejector or alkali wash.

Evaporation of a carbonated black liquor having a pH below 11 in accordance with the invention will produce noncondensible gases of which at least 90 percent by volume is composed of hydrogen sulfide. Air leaks in the recovery system may reduce this somewhat, and therefore, about 80 percent $H_2S$ by volume is a practicable proportion in a commercial system with small amounts of air leaking into the system. Since the separation of condensible gases, such as steam, from the gases liberated from the evaporating liquor is rather easy, this means that in the process of the invention, an efficient and effective recovery of hydrogen sulfide is possible.

After separation from the condensible gases, the hydrogen sulfide can then be recovered for oxidation by any of several techniques.

In one process, the hydrogen sulfide is removed from the evaporation system by connecting the common exhaust gas conduit to a pressure increasing means, such as a centrifugal pump, a piston compressor, or a blower, increasing the pressure of the hydrogen sulfide to above the pressure prevailing in the evaporation system, so that the gas can then be brought to the oxidizing system.

In another embodiment, the hydrogen sulfide can be absorbed from the noncondensible gases by passing them through or over a suitable absorbent, such as for instance a solution of monoethanolamine, diethanolamine, triethanolamine, potassium bicarbonate or sodium bicarbonate, or an ammoniacal solution of ammonium sulfate, desirably under vacuum and at a low temperature. After the absorbent is saturated with hydrogen sulfide, or nearly so, it can be transferred to a suitable desorption apparatus, operating under a pressure slightly above atmospheric and at an elevated temperature, whereby hydrogen sulfide can be stripped off, and then flowed directly to the oxidizing system, while the absorbent is returned to the absorption apparatus.

The hydrogen sulfide thus recovered is oxidized partly with air or sulfur dioxide in the Claus process by preheating a suitably controlled hydrogen-sulfide reaction mixture, and introducing it into a reaction bed, whereupon the resulting sulfur is condensed and separated.

The sulphur that is recovered can be dissolved directly in a sulfide-containing aqueous solution to form polysulfide. The sulfide-containing aqueous solution is preferably alkaline, and can be prepared either by dissolving the melt formed by combustion of black liquor in water, after causticizing, or by dissolving separately, and then blending the solutions, when ready for use, of sodium hydroxide, and sodium hydrosulfide or sodium sulfide. If a higher purity is required, the hydrogen sulfide derived from the black liquor evaporation can be absorbed in alkaline aqueous solution, and this can be used as the solution for dissolving sulfur.

The process can also be combined with the evaporation of black liquor from normal sulfate pulping, so that hydrogen sulfide is taken therefrom, and converted into elemental sulfur, while the resulting sulfur loss is compensated by liquor of higher sulfidity from the polysulfide system, such as evaporated black liquor or dissolved melt.

The process of the invention is applicable to black liquor obtained from the usual kraft process. It is particularly applicable to black liquor obtained from a polysulfide kraft process. Polysulfide cooking is described in Rydholm under Chapter 9, Section I, page 642. Polysulfide cooking gives an increase in yield, as compared to a normal kraft cook, and in general employs at least from 30 to 40 kg. per ton of wood of polysulfide sulfur for a substantial yield improvement. Sulfur is added to the white liquor in order to increase the polysulfide sulfur content, but this is not normally done well in advance of the cooking, since the polysulfides may be destroyed at high alkalinities. Consequently, in this procedure the best method is to separate the sulfide and carbonate of the recovered alkali smelt after the combustion process by fractional crystallization, causticize only the carbonate, and dissolve the sulfur in the sulfide solution, where the alkalinity is not excessive, and where the polysulfides formed are fairly stable.

The process of the invention is particularly useful in polysulfide kraft cooking, because the hydrogen sulfide is recovered in the form of sulfur, which can be returned directly to the regenerated cooking liquor by dissolution in the sulfide solution obtained after the combustion step in the recovery procedure. Further information on polysulfide cooking will be found in the Rydholm text, the disclosure of which is hereby incorporated by reference.

The following example in the opinion of the inventor represents a preferred embodiment of this invention.

EXAMPLE

The process of the invention was applied in a kraft pulp mill, which produced 20 tons per hour of sulfate pulp, digested by means of a liquor containing 35 g. of polysulfide sulfur per ton of pulp. The total sulfur charged was 100 kg. per ton of pulp. The alkali losses in the system corresponded to 8 kg. of sulfur per ton of pulp.

The process of the invention was applied to this mill as follows. The pH of the black liquor recovered from the polysulfide pulping was reduced to 9.0 by treatment with 3000 cubic meters per hour of combustion gases containing 15 percent carbon dioxide. The carbonated black liquor was then subjected to evaporation under vacuum. During evaporation, 20 kg. of sulfur per ton of pulp was volatilized as hydrogen sulfide, corresponding to 280 normal cubic meters per hour of hydrogen sulfide.

The gases from the evaporating liquor was passed through a water condenser, so as to remove the condensible steam as water. The resulting noncondensible gases including the hydrogen sulfide were at a pressure of 0.15 atmosphere, and a temperature of 60° C. Over 90 percent of the noncondensible gases were composed of hydrogen sulfide. Consequently, the gases could be passed without further purification directly to the Claus oxidizer, and this is what was done.

The pressure of the recovered hydrogen sulfide mixture was increased to 1.4 atmospheres in a piston compressor, and the gas was then mixed with 700 normal cubic meters per hour of air, preheated to 365° C., and was then reacted in a Claus reactor packed with bauxite. The resulting sulfur, 18 kg. per ton of pulp, was condensed at 140° C., and passed to the polysulfide preparation system.

The combustion of the black liquor after evaporation was carried out so that 7 kg. of sulfur per ton of pulp left with the combustion gases as sulfur dioxide, which was not recovered. The requirement of make-up sulfur was 17 kg. sulfur per ton of pulp. This was added as elemental sulfur, and together with the recovered sulfur, afford 35 kg. of polysulfide per ton of pulp. The regenerated white liquor was then ready for use for digestion of a further batch of wood.

Having regard to the foregoing disclosure, the following is claimed as the inventive and patentable embodiments thereof:

1. A process for the economical recovery of hydrogen sulfide from the waste gases obtained during the evaporation of alkaline black liquor, and particularly polysulfide-containing alkaline black liquor, from the kraft pulping process and using the sulfur from the hydrogen sulfide to form a sulfide cooking liquor, comprising preparing the black liquor for evaporation in a manner which ensures the liberation of a relatively high concentration of hydrogen sulfide in the effluent noncondensible gases (compared to that normally liberated) and a high ratio of hydrogen sulfide to oxygen in such gases, while at the same time holding to a minimum the volume of combustion gases brought in contact with the evaporating liquor, by carbonating the black liquor with combustion gases containing at least about 15 percent carbon dioxide, in an amount to reduce the alkaline black liquor to a pH below 11, the combustion gases being less than about 20 normal cubic meters per cubic meter of unevaporated black liquor, and then stripping hydrogen sulfide from the resulting liquor, while evaporating the liquor to increase the solids content to at least 45 percent, said evaporation carried out without addition of combustion gases, thereby removing a portion of the sulfur of the liquor as hydrogen sulfide, and forming a proportion of at least 80 percent hydrogen sulfide in the noncondensible gases liberated from the black liquor, recovering hydrogen sulfide from the condensible gases evolved in the evaporation, oxidizing the recovered hydrogen sulfide to sulfur with air or sulfur dioxide, and dissolving the sulfur in a sulfide-containing aqueous solution to form a sulfide cooking liquor.

2. A process according to claim 1 in which the black liquor is a polysulfide black liquor and the sulfur is dissolved to form a polysulfide cooking liquor.

3. A process according to claim 1, in which the sulfide-containing aqueous solution is obtained by combustion of the evaporated black liquor, to form a residue comprising alkali carbonate and alkali sulfide, causticizing the residue to form alkali hydroxide and alkali sulfide, and dissolving the residue in water.

4. A process according to claim 1 in which the carbon dioxide content of the combustion gases is within the range from about 15 to about 21 percent.

5. A process according to claim 1, in which the quantity of available hydrogen sulfide is less than 22 kg. per ton of pulp, and the amount of combustion gases is less than 150 normal cubic meters per ton of pulp.

6. A process according to claim 1 in which the pH of the black liquor is reduced to within the range from about 11 to about 9.

7. A process according to claim 6 in which the amount of hydrogen sulfide liberated during the stripping operation, based on the total amount of sulfur in the liquor, is controlled within the range from about 9 to about 25 percent.

8. A process according to claim 1 in which the combustion gases are the gases that are obtained during the combustion stage of the evaporated black liquor.

9. A process according to claim 1 in which the evaporation is effected under vacuum and hydrogen sulfide is fed under pressure to the oxidizing step.

10. A process according to claim 1 in which the hydrogen sulfide is separated from the gases evolved during the evaporation by absorption in a suitable absorbent, desorbed, and then fed to the oxidizing step.

References Cited

UNITED STATES PATENTS

| | | | |
|---|---|---|---|
| 2,944,928 | 7/1960 | Kibrick | 162—82 X |
| 3,293,113 | 12/1966 | Venemark | 162—30 |
| 3,331,732 | 7/1967 | Venemark | 162—30 |
| 3,331,733 | 7/1967 | Venemark | 162—30 |

I. LEON BASHORE, Primary Examiner

R. H. ANDERSON, Assistant Examiner

U.S. Cl. X.R.

23—48